United States Patent [19]

Knödel

[11] Patent Number: 4,561,532
[45] Date of Patent: Dec. 31, 1985

[54] TORSIONAL VIBRATION REDUCING CONNECTION BETWEEN AN INTERNAL COMBUSTION ENGINE AND A TRANSMISSION

[75] Inventor: Gunter Knödel, Mühlacker, Fed. Rep. of Germany

[73] Assignee: Getrag Getriebe- und Zahnradfabrik GmbH, Ludwigsburg, Fed. Rep. of Germany

[21] Appl. No.: 425,940

[22] Filed: Sep. 28, 1982

[30] Foreign Application Priority Data

Feb. 26, 1982 [DE] Fed. Rep. of Germany ....... 3206837

[51] Int. Cl.[4] ........................ F16D 3/12; F16D 3/50; F16D 3/84
[52] U.S. Cl. .................................. 192/106.1; 74/574; 192/30 V; 192/110 B; 474/71
[58] Field of Search ............... 192/30 V, 70.19, 106.1, 192/110 B, 112; 74/574; 464/71, 180

[56] References Cited

U.S. PATENT DOCUMENTS

| | | |
|---|---|---|
| 1,277,129 | 8/1918 | Royce . |
| 1,565,722 | 12/1925 | Evans ................................. 192/70.19 |
| 1,609,448 | 12/1926 | Wemp ............................... 192/70.17 |
| 2,089,472 | 8/1937 | Geyer ................................. 192/70.17 |
| 2,105,188 | 1/1938 | Guy .................................... 192/70.17 |
| 2,328,518 | 8/1943 | Wahlberg et al. ............... 192/112 X |
| 2,660,475 | 11/1953 | Ormsby ............................ 74/574 X |
| 2,724,377 | 11/1955 | Nallinger ........................... 74/574 X |
| 2,776,556 | 1/1957 | Gustafson et al. .................... 464/97 |
| 2,837,901 | 6/1958 | Chapman ........................... 464/71 X |
| 2,982,150 | 5/1961 | Kolbe ............................. 192/70.14 X |
| 3,768,276 | 10/1973 | Caldwell et al. .................. 464/71 X |
| 3,868,833 | 3/1975 | Noe et al. ................................464/71 |
| 3,979,973 | 9/1976 | Klaue ................................... 74/740 |
| 4,317,435 | 3/1982 | Kohlhage ...................... 192/48.8 X |
| 4,366,887 | 1/1983 | Hofbauer et al. ................. 192/48.1 |
| 4,425,813 | 1/1984 | Wadensten ........................ 464/71 X |
| 4,468,207 | 8/1984 | Yoshida ............................. 74/574 X |

FOREIGN PATENT DOCUMENTS

| | | |
|---|---|---|
| 651882 | 9/1937 | Fed. Rep. of Germany . |
| 2257659 | 5/1974 | Fed. Rep. of Germany . |
| 7700470 | 5/1977 | Fed. Rep. of Germany . |
| 2826274 | 12/1978 | Fed. Rep. of Germany . |
| 2753717 | 6/1979 | Fed. Rep. of Germany . |
| 2916277 | 10/1980 | Fed. Rep. of Germany ... 192/30 V |
| 2341068 | 9/1977 | France . |
| 0259959 | 8/1928 | United Kingdom .................. 74/574 |
| 736471 | 9/1955 | United Kingdom . |
| 1079109 | 7/1967 | United Kingdom . |
| 2062777 | 5/1981 | United Kingdom . |

Primary Examiner—Rodney H. Bonck
Attorney, Agent, or Firm—Burmeister, York, Palmatier, Hamby & Jones

[57] ABSTRACT

In an arrangement embracing an internal combustion engine and transmission, intended in particular for use in motor vehicles, the crankshaft is split on the side of the flywheel (6) facing the engine and the crankshaft sections are interconnected via a torsionally elastic intermediate member (9). The crankshaft section (5) carrying the flywheel (6) may be seated in a bearing (4) disposed in an intermediate flange rigidly connected with the transmission housing (1). Further, the housings (1, 2) of the engine and the transmission may also be connected via elastic elements (31). This arrangement of torsionally elastic elements reduces considerably the transmission of torsional forces to the transmission and makes it possible to substantially reduce the idling speeds of motor vehicles and to put up with the torsional vibrations thereby created because they are no longer transmitted to the transmission and do not, consequently, give rise to noises which are transmitted to the car body through the transmission, its housing and other components of the drive train.

11 Claims, 1 Drawing Figure

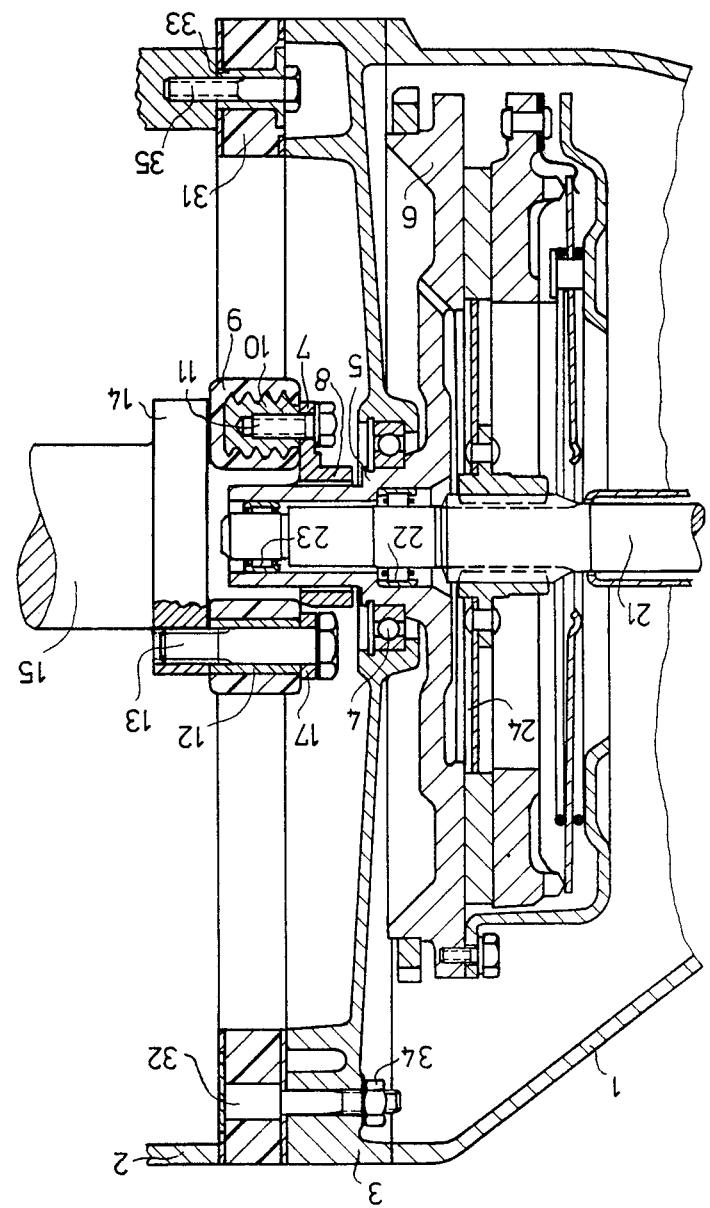

TORSIONAL VIBRATION REDUCING CONNECTION BETWEEN AN INTERNAL COMBUSTION ENGINE AND A TRANSMISSION

FIELD OF THE INVENTION

The present invention relates to an arrangement embracing an internal combustion engine and transmission, in particular for motor vehicles, in which the transmission drive shaft arranged in end-to-end alignment with the crankshaft of the engine is connected with the crankshaft carrying a flywheel and in which a torsionally elastic damping member is provided within the chain of the elements transmitting the engine torque to the transmission.

BACKGROUND OF THE INVENTION

When using internal combustion engines, in particular piston engines having only a small number of cylinders, for driving motor vehicles, irregularities in the rotational speeds are encountered which are caused by gas and inertia forces. Depending on the type of construction and operational characteristics of the engine, these irregularities are balanced out to a greater or less degree by a flywheel arranged on the engine crankshaft and the design of the crankshaft itself. In any case, however, the balancing effect achieved heretofore has been insufficient. Particularly heavy irregularities are encountered with the engine idling at low speeds, because in this condition the operation of the engine is particularly unstable and, in addition, any balancing inertia forces are lacking, except for the flywheel.

The irregularities make themselves felt in the form of torsional vibrations which are transferred to the transmission and the entire drive train. In consequence thereof, rattling noises are produced, specially by the positively locking transmission elements, such as gears and clutches, and these noises are transmitted to the outside through parts of the housing and body and are felt to be disagreeable and disturbing, and this in particular within the resonant ranges. Heretofore, it has been tried to counteract these phenomena by providing torsional vibration dampers within the drive train and by mounting the arrangement in rubber elements. To this end, it has been known to provide torsionally elastic elements in the driver disk of a clutch provided between crankshaft and transmission shaft. It has also been known to provide the crankshaft with damping elements which respond to and counteract spin accelerations. Usually, such damping elements are arranged at the end of the crankshaft opposite the end carrying the flywheel and the clutch provided with the torsionally elastic damping elements.

As has been mentioned before, the above-described known measures are only to a very limited degree capable of damping the torsional vibrations caused by irregularities in the rotational speed of the engine. The known damping elements are effective only within a limited vibration range. Especially in the case of low frequencies, their effectiveness decreases rapidly so that the disagreeable noise makes itself particularly felt when the motor is idling. These torsional vibrations and the noises resulting therefrom have to this date set insurmountable limits to all efforts aiming at reducing the idling speed of motor vehicles below the values presently regarded as normal, in order to save fuel.

SUMMARY OF THE INVENTION

Now, it is the object of the present invention to provide an arrangement of the type described above embracing an internal combustion engine and transmission in which the damping of torsional vibrations, especially at low frequencies, is substantially improved so that the idling speed of such an arrangement can be considerably reduced without thereby giving rise to vibrations and noises in excess of the levels that are normally regarded as tolerable.

This problem is solved by the invention in that the crankshaft is split at the side of the flywheel facing the engine and that the sections of the crankshaft are interconnected through a torsionally elastic intermediate member.

In such a unit, there is sufficient room on the side of the flywheel facing the engine to accommodate torsionally elastic intermediate members acting as highly effective torsional vibration dampers over the full speed range. It is a particular advantage of the arrangement of this torsional vibration damper between the flywheel and the engine that it prevents from the very beginning any transmission to the flywheel of the torsional vibrations emanating from the engine. This considerably improves the equalizing effect of the flywheel, and only the uniform movement of the flywheel which is isolated from the engine by the damping elements is transmitted to the transmission. Consequently, there cannot arise any rattling noises in the positively locking transmission elements that could be transmitted to the outside through parts of the housing and body and make themselves felt as disturbing. As a result thereof, the invention achieves an improvement in vibration characteristics and noise generation in an arrangement embracing an internal combustion engine and transmission, which enables in particular the idling speed of the internal combustion engine to be lowered considerably below the previously usual level and which further entails an extended service life of the transmission because the particular arrangement of the invention eliminates the jerky stresses caused by the torsional vibrations and acting on the transmission which are the cause not only of the nosies but also of increased wear.

In a preferred embodiment of the invention, the crankshaft section carrying the flywheel is seated in a bearing connected with the transmission housing. It is an advantage of this arrangement of the invention that the crankshaft section carrying the flywheel can be seated in the transmission housing exactly in line with the transmission drive shaft which on the one hand improves the running properties of the arrangement and, on the other hand, facilitates the production processes because it is no longer necessary to bring the crankshaft seated in the engine housing in proper alignment with the transmission drive shaft seated in the transmission housing during assembly of the engine and the transmission. Instead, a certain set-off between the transmission drive shaft and the crankshaft section seated in the engine housing can be accepted because it will be balanced out without difficulty by the torsionally elastic intermediate members. In such an arrangement, the bearing receiving the crankshaft section carrying the flywheel may advantageously be arranged in an intermediate flange rigidly mounted at the end of the transmission housing.

The fact that a certain set-off may be accepted between the crankshaft section seated in the engine housing and the crankshaft section connected with the transmission further offers the possibility, by way of an improvement to the invention, to connect also the engine and transmission housings themselves through elastic elements. This measure prevents in addition the transmission of vibrations from the engine housing to the transmission housing and provides an additional damping effect against vibrations introduced into the engine housing. Accordingly, this measure also provides a considerable additional vibration and noise damping effect.

Another particular advantage of the arrangement of the invention is to be seen in the fact that it does not in any way disturb the accepted procedures for assembling the internal combustion engine and the transmission. The invention does not, for example, preclude in any manner the end of the transmission drive shaft from being seated in the crankshaft section carrying the flywheel in the same manner in which the end of the drive shaft has been seated heretofore in the end of the single-piece crankshaft carrying the flywheel. In contrast, this assembly procedure is considerably improved and facilitated by the arrangement of the invention as compared to conventional arrangements in that, as described before, the crankshaft section carrying the flywheel is seated in the transmission housing itself so that any alignment errors can be easily eliminated.

Further, the arrangement of the invention makes it possible to arrange between the internal combustion engine and the transmission a clutch comprising a driver disk axially displacable along the transmission shaft and coacting with the flywheel. As regards this arrangement, it is also an advantage that the flywheel is seated in the transmission housing and the coacting parts of the clutch are concentrically seated with a high degree of precision. Further, it is an advantage of this arrangement that the damping elements heretofore usually provided in the driver disk of the clutch can be eliminated. This not only simplifies and reduces the space requirements of the clutch, but also considerably reduces the moment of inertia of the driver disk of the clutch which can now do without integrated damping elements, so that the shifting properties of synchronized transmissions are improved. The masses which must be accelerated or retarded for synchronization purposes include also the driver disk of the clutch whose moment of inertia absorbs a quite considerable portion of the synchronization energy. So, the reduction of this moment of inertia rendered possible through the invention is quite important.

BRIEF DESCRIPTION OF THE DRAWING

The invention will be described hereafter in detail with reference to the embodiment shown in the drawing which is a longitudinal section through the adjacent portions of an internal combustion engine and a transmission combined to form one arrangement.

DETAILED DESCRIPTION OF AN ILLUSTRATIVE EMBODIMENT

In the arrangement shown in the drawing, the housing 1 of a manually shifted transmission is closed at its end facing the housing 2 of an internal combustion engine by an intermediate flange 3 whose central portion carries a ball bearing 4. A hollow shaft 5 is rotatably seated in the said ball bearing 4 and carries on its end facing the transmission—which is not shown in detail—a flywheel 6 which, accordingly, is to be found on that side of the intermediate flange 3 which faces the interior of the transmission housing 1.

The other end of the hollow shaft 5 which projects from the bearing 4 in the direction of the engine housing, carries a flanged ring 8 connected with the hollow shaft 5 by splines so as to rotate with the shaft. Fastened to the flange-like section 7 of the flanged ring 8 is an annular resilient cushioning element or ring 9 which has distributed over its circumference vulcanized inserts 10 into which are screwed screws 11 passed through bores disposed in the flanged-like section 7 of the flanged ring 8. The inserts 10 provided in the resilient cushioning element 9 alternate with vulcanized sleeves 12 passed by screwbolts 13 the threaded ends of which engage a flange 14 disposed at the end of a shaft 15. The said shaft 15 is a section of the crankshaft of the engine not shown in detail, and conventionally seated in the engine housing 2. The crankshaft is completed by another section formed by the hollow shaft 5 and carrying the flywheel 6. Consequently, in the embodiment shown in the drawing the crankshaft of the engine is formed by the shaft or section 15 and the section 5, such section 5 carrying the flywheel and the two sections being interconnected by a torsionally elastic intermediate member formed by the annular resilient cushioning element 9. Washers 17 are interposed between the heads of the bolts 13 and the ends of the sleeves 12. In the embodiment shown in the drawing, the drive shaft 21 of transmission housing 1 is in the known manner rotatably seated by means of two roller bearings 22, 23 in the end of the crankshaft facing the transmission, i.e. in the hollow shaft 5 which forms one section of the crankshaft. It is a particular advantage of this arrangement that the hollow shaft 5 is seated in the intermediate flange 3 which is rigidly connected to the transmission housing 1 so that the bearing carrying the hollow shaft 5 can be exactly aligned with the bearings mounted in the transmission housing 1 and carrying the drive shaft 21. The precise alignment of drive shaft 21 and hollow shaft 5 is of particular advantage for the arrangement of the clutch which comprises in the usual manner a driver disk 24 which while being displaceable along the drive shaft 21 of the transmission is fixed against rotation and coacts in the known manner with an adjacent flat portion of the surface of flywheel 6. The structure of such clutches coacting with the flywheel of the engine is generally known and need not be described here in detail. It should, however, be mentioned that due to the arrangement of a torsionally elastic intermediate member between the shaft or section 15 and the section 5 of the crankshaft there is no need to split the driver disk and to provide it with integrated damping elements. This simplifies the design of the clutch and reduces its space requirements. A particular advantage is to be seen in the fact that the elimination of such damping elements reduces considerably the mass of the drive disk of the clutch and, thus, the masses to be accelerated and/or retarded by the synchronizing mechanisms driuing a shifting operation. And this in turn facilitates the shifting operation and increases the service life of the synchronizing mechanisms.

In the embodiment shown in the drawing, the transmission housing 1 and the engine housing 2 are not directly rigidly connected, but have arranged between them another damping element 31 in the form of an annular resilient cushioning element which has vulcanized to its circumference, in alternating succession, studs 32 and sleeves 33. The studs 32 project through bores provided in the intermediate flange 3 which is rigidly connected to the transmission housing 1 and are tightened within the said bores by means of nuts 34. The sleeves 33 received screw bolts 35 screwed into corresponding threaded bores in the engine housing 2. In this manner, a torsionally elastic and vibration-damping connection is provided also between the engine housing 2 and transmission housing 1 which largely eliminates any transmission of torsional vibrations from the engine to the transmission. The uniformity of movement of the transmission is further enhanced by the fact that the balancing flywheel 6 is arranged on the transmission side of the damping elements so that the uniform motion of the transmission has the full benefit of its equalizing effect.

It goes without saying that the invention is by no means restricted to the embodiment shown but that certain deviations can be envisaged without departing from the scope of the invention. The vibration-damping effect of the arrangement of the invention is, for instance, by no means influenced by the manner in which the drive shaft of the transmission is connected to the crankshaft of the engine. So, the clutch may be replaced, for instance, by any other torque-transmitting arrangement. In principle, the transmission shaft in the crankshaft section carrying the flywheel could be designed also as one piece so that the flywheel would actually be mounted on the transmission drive shaft and, thus, be part of the transmission in which case the transmission drive shaft would be connected to the engine crankshaft via the torsionally elastic intermediate member. In the above specification, the hollow shaft 5 was regarded as part of the crankshaft only because the flywheel is usually designed as part of the engine and arranged on the crankshaft.

Now, it is not absolutely necessary for the purposes of the invention to provide vibration-damping elements also between the engine housing and the transmission housing, though the possibility of such a connection presents a particular advantage of the invention. Further, it goes without saying that the torsionally elastic intermediate members used to connect the crankshaft sections and/or the housings may have any desired design provided they are capable on the one hand of safely transmitting the torques encountered in operation and, on the other hand, of sufficiently damping the vibrations encountered in operation. So, the described annular resilient cushioning elements may for instance be replaced by a number of individual resilient cushioning elements. The use of individual resilient cushioning elements may be particularly advantageous for the connection of the housing because the gaps between the individual resilient cushioning elements could guarantee satisfactory ventilation of the housings in the area between the engine and the transmission.

I claim:
1. A connecting construction for use between an internal combustion engine and a transmission of a vehicle,
said construction comprising an engine housing,
an engine crankshaft rotatably mounted in said engine housing,
a transmission housing,
a transmission drive shaft rotatably mounted in said transmission housing,
an additional crankshaft section,
a flywheel mounted on said additional crankshaft section and solidly secured thereto for rotation therewith,
said transmission housing having bearing supporting means thereon,
a bearing connected between said bearing supporting means and said additional crankshaft section and rotatably supporting said additional crankshaft section,
said additional crankshaft section having an end portion extending toward said crankshaft,
torsionally elastic coupling means connected between said crankshaft and said end portion of said additional crankshaft section for elastically transmitting driving torque between said crankshaft and said additional crankshaft section,
said additional crankshaft section transmitting said driving torque to said flywheel,
said torsionally elastic coupling means reducing torsional vibrations transmitted to said flywheel,
a torque transmitting device for transmitting torque between said flywheel and said transmission drive shaft,
and torsionally elastic connecting means connected between said engine housing and said transmission housing for reducing torsional vibrations transmitted therebetween.

2. A connecting construction according to claim 1,
said bearing supporting means comprising an inwardly projecting flange on said transmission housing for supporting said bearing.

3. A connecting construction according to claim 1,
said torque transmitting device comprising clutch means for selectively transmitting driving torque between said flywheel and said transmission drive shaft.

4. A connecting construction according to claim 1,
said additional crankshaft section having a hollow space therein with internal bearing means in said hollow space,
said transmission drive shaft having an end portion extending into said hollow space and being rotatably supported by said internal bearing means.

5. A connecting construction according to claim 1,
said torsionally elastic coupling means comprising a torsionally elastic annular member made of elastic vibration damping material,
with first and second separate connecting means for separately connecting said annular member to said crankshaft and said additional crankshaft section.

6. A connecting construction according to claim 1,
said torsionally elastic connecting means comprising a torsionally elastic ring member made of elastic vibration damping material with separate connecting elements for separately connecting said ring member to said engine housing and said transmission housing.

7. A torsional vibration reducing connecting construction for use between an internal combustion engine and a transmission of a vehicle,
said construction comprising an engine housing,
a crankshaft rotatably supported in said engine housing,
a transmission housing,
a transmission drive shaft rotatably supported in said transmission housing,
a hollow additional crankshaft section,
a flywheel disposed in said transmission housing and securely mounted on said additional crankshaft section for rotation therewith, said transmission housing having an inwardly projecting flange thereon,
a bearing connected between said flange and said additional crankshaft section and rotatably supporting said additional crankshaft section,
said additional crankshaft section having an end portion extending toward said crankshaft,
a torsionally elastic annular coupling member made of elastic vibration damping material and connected between said crankshaft and said end portion of said additional crankshaft section for elastically transmitting driving torque therebetween while reducing the transmission of torsional vibrations,
said annular coupling member having separate connecting means for separately connecting said coupling member to said crankshaft and said additional crankshaft section,
said additional crankshaft section having a hollow space therein with internal bearing means in said hollow space,
said transmission drive shaft having an end portion extending into said hollow space and rotatably supported by said internal bearing means,
clutch means in said transmission housing for selectively transmitting driving torque between said flywheel and said transmission drive shaft,
a torsionally elastic ring member made of elastic vibration damping material and connected between said engine housing and said transmission housing for reducing the transmission of torsional vibrations therebetween,
and separate connecting elements for separately connecting said torsionally elastic ring member to said engine housing and said transmission housing.

8. A torsional vibration reducing connecting construction for use between an internal combustion engine and a transmission of a vehicle,
said construction comprising an engine housing,
a crankshaft rotatably supported in said engine housing,
a transmission housing,
a transmission drive shaft rotatably supported in said transmission housing,
a hollow additional crankshaft section disposed in said transmission housing and having an end portion projecting therefrom toward said crankshaft,
a flywheel disposed in said transmission housing and securely mounted on said additional crankshaft section for rotation therewith,
said transmission housing having an inwardly projecting flange,
a bearing connected between said flange and said additional crankshaft section for rotatably supporting said additional crankshaft section,
said inwardly projecting flange being disposed between said flywheel and said engine housing,
torsionally elastic coupling means connected between said crankshaft and said end portion of said additional crankshaft section for elastically transmitting driving torque therebetween while reducing the transmission of torsional vibrations,
said coupling means including an elastic member made of vibration damping material,
said additional crankshaft section transmitting the driving torque to said flywheel,
said additional crankshaft section having a hollow space with internal bearing means therein,
said transmission drive shaft having an end portion extending into said hollow space and rotatably supported by said internal bearing means,
clutch means in said transmission housing for selectively transmitting driving torque between said flywheel and said transmission drive shaft,
and connecting means connected between said transmission housing and said engine housing.

9. A construction according to claim 8,
said connecting means comprising torsionally elastic connecting means including a torsionally elastic member made of elastic vibration damping material for reducing the transmission of torsional vibrations between said engine housing and said transmission housing.

10. A construction according to claim 8,
said connecting means comprising a torsionally elastic ring member made of elastic vibration damping material and connected between said engine housing and said transmission housing for reducing the transmission of torsional vibrations therebetween,
and separate connecting elements for separately connecting said ring member to said engine housing and said transmission housing.

11. A construction according to claim 8,
said torsionally elastic member of said coupling means being in the form of an annular member made of elastic vibration damping material and having separate connecting elements for separately connecting said annular member to said crankshaft and said additional crankshaft section.

* * * * *